(12) United States Patent
Koyama et al.

(10) Patent No.: US 8,890,391 B2
(45) Date of Patent: Nov. 18, 2014

(54) EXTERNAL FORCE DETECTION APPARATUS AND EXTERNAL FORCE DETECTION SENSOR

(75) Inventors: Mitsuaki Koyama, Saitama (JP); Takeru Mutoh, Saitama (JP); Hiroki Iwai, Saitama (JP); Ryoichi Ichikawa, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 385 days.

(21) Appl. No.: 13/528,838

(22) Filed: Jun. 21, 2012

(65) Prior Publication Data

US 2012/0326566 A1 Dec. 27, 2012

(30) Foreign Application Priority Data

Jun. 24, 2011 (JP) ................................ 2011-140573

(51) Int. Cl.
*H01L 41/04* (2006.01)
*G01L 1/14* (2006.01)
*G01P 15/097* (2006.01)
*G01P 15/125* (2006.01)
*G01L 1/16* (2006.01)

(52) U.S. Cl.
CPC .............. *G01L 1/144* (2013.01); *G01P 15/097* (2013.01); *G01P 15/125* (2013.01); *G01L 1/162* (2013.01)
USPC ............................ 310/331; 310/338; 310/330

(58) Field of Classification Search
CPC ..... G01P 15/097; G01P 15/125; G01P 15/09; G01P 15/0907; G01P 15/0922
USPC .......................................... 310/338, 330–332
See application file for complete search history.

(56) References Cited

U.S. PATENT DOCUMENTS

| | | | | |
|---|---|---|---|---|
| 5,095,752 A | * | 3/1992 | Suzuki et al. ............... | 73/514.32 |
| 5,228,341 A | * | 7/1993 | Tsuchitani et al. ......... | 73/514.36 |
| 5,290,102 A | * | 3/1994 | Kaiser et al. ................ | 374/120 |
| 5,350,189 A | * | 9/1994 | Tsuchitani et al. .......... | 280/735 |

(Continued)

FOREIGN PATENT DOCUMENTS

| | | |
|---|---|---|
| CN | 1143749 A | 2/1997 |
| CN | 1796952 A | 7/2006 |

(Continued)

OTHER PUBLICATIONS

"First Office Action of China Counterpart Application", issued on Dec. 18, 2013, with partial English translation thereof, p. 1-p. 10, in which the listed references were cited.

*Primary Examiner* — Jaydi San Martin
(74) *Attorney, Agent, or Firm* — Jianq Chyun IP Office

(57) ABSTRACT

In an external force detection apparatus, a crystal plate is cantilevered within a container. Excitation electrodes are formed on the top surface and the bottom surface of the crystal plate. A movable electrode is formed on a distal end on the bottom surface of the crystal plate and is connected to the excitation electrode on the bottom surface via an extraction electrode. A fixed electrode is provided on the bottom of the container to oppose the movable electrode. The excitation electrode on the top surface and the fixed electrode are connected to an oscillating circuit. When an external force acts on the crystal plate to bend it, the capacitance between the movable electrode and the fixed electrode changes, and this capacitance change is captured as a change in the oscillating frequency of the crystal plate.

4 Claims, 10 Drawing Sheets

(56) References Cited

U.S. PATENT DOCUMENTS

| | | | |
|---|---|---|---|
| 5,392,651 A * | 2/1995 | Suzuki et al. | 73/514.32 |
| 5,417,312 A * | 5/1995 | Tsuchitani et al. | 188/181 A |
| 5,559,290 A * | 9/1996 | Suzuki et al. | 73/514.36 |
| 5,616,844 A * | 4/1997 | Suzuki et al. | 73/514.32 |
| 5,676,851 A * | 10/1997 | Suzuki et al. | 216/2 |
| 5,927,143 A * | 7/1999 | Cho et al. | 73/514.36 |
| 6,153,917 A * | 11/2000 | Matsunaga et al. | 257/419 |
| 6,230,564 B1 * | 5/2001 | Matsunaga et al. | 73/514.01 |
| 8,100,016 B2 * | 1/2012 | Nishizawa et al. | 73/651 |
| 8,154,176 B2 * | 4/2012 | Karakaya et al. | 310/339 |
| 8,497,672 B2 * | 7/2013 | Kawakubo et al. | 324/162 |
| 8,569,937 B1 * | 10/2013 | Kubena et al. | 310/366 |
| 2003/0183004 A1 | 10/2003 | Furukubo et al. | |
| 2008/0202239 A1 | 8/2008 | Fazzio et al. | |
| 2013/0263661 A1 * | 10/2013 | Watanabe | 73/504.12 |

FOREIGN PATENT DOCUMENTS

| | | |
|---|---|---|
| CN | 101153825 A | 4/2008 |
| JP | 2006-138852 | 6/2006 |
| JP | 2008-039626 | 2/2008 |

* cited by examiner

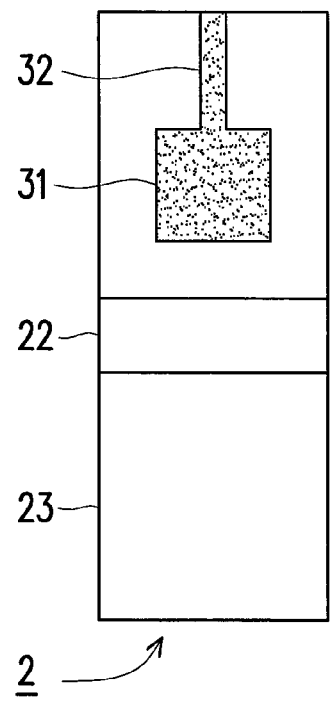
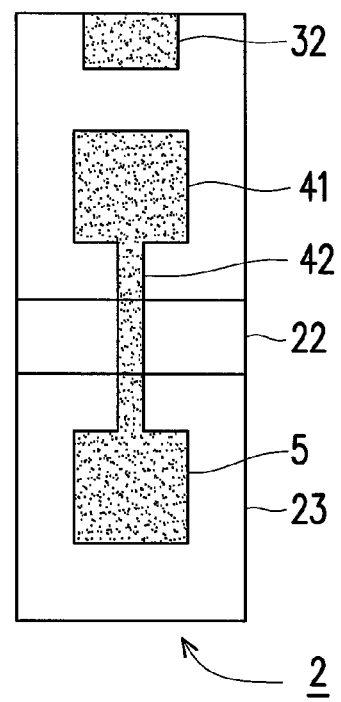
FIG. 2A    FIG. 2B
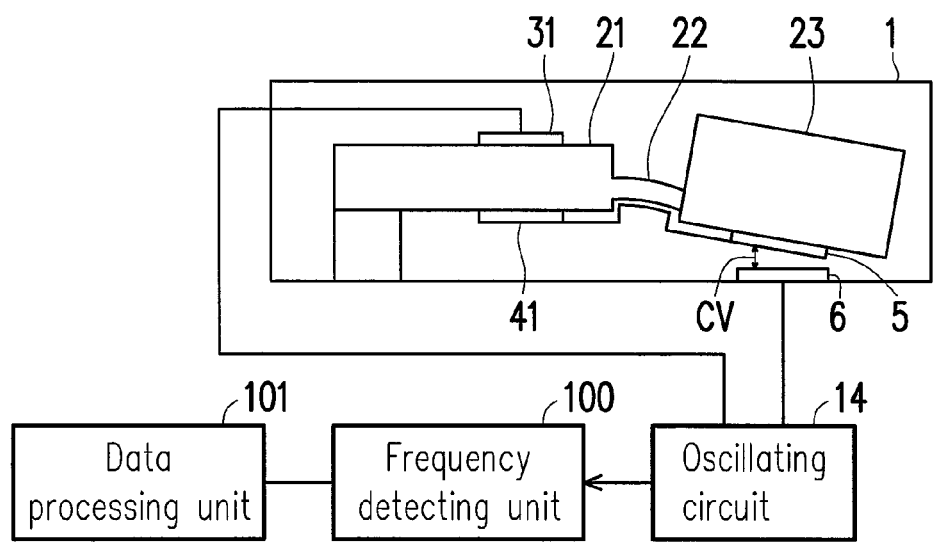
FIG. 3

EXTERNAL FORCE DETECTION APPARATUS AND EXTERNAL FORCE DETECTION SENSOR

CROSS-REFERENCE TO RELATED APPLICATIONS

This application claims the priority benefit of Japan application serial no. 2011-140573, filed on Jun. 24, 2011. The entirety of the above-mentioned patent application is hereby incorporated by reference herein and made a part of this specification.

BACKGROUND OF THE INVENTION

1. Field of the Invention

The present invention relates to the technical field of detecting an external force such as acceleration, pressure, flow rate of a fluid, magnetic force, or electrostatic force by using a piezoelectric plate such as a crystal plate to detect the size of the external force acting on the piezoelectric plate based on an oscillating frequency.

2. Description of Related Art

Some examples of an external force that acts on a system are a force that acts on an object based on acceleration, pressure, flow rate, magnetic force, electrostatic force, and the like, and there are many cases in which such external forces must be measured accurately. For example, during the course of development of an automobile, the force of impact on the seats when the automobile collides with an object is measured. Further, the acceleration of shaking during an earthquake must be investigated with as much precision as possible in order to examine the vibrational energy and amplitude of the earthquake.

In addition, as other examples of measuring external forces, there are cases in which the flow rate of a fluid or gas is accurately investigated and the detected values are reflected in a control system, or cases in which the performance of a magnet is measured.

When taking such measurements, it is desirable for the measuring apparatus to measure with high accuracy using a structure that is as simple as possible.

Patent Document 1 discloses that a piezoelectric film is cantilevered and deforms due to a change in a surrounding magnetic force, and thereby a change occurs in a current flowing to the piezoelectric film.

Patent Document 2 discloses providing a capacitively-coupled pressure sensor and a crystal unit that is arranged in a space that is separated from a region in which the pressure sensor is arranged, and connecting a variable capacitance of the pressure sensor and the crystal unit in parallel. Patent Document 2 further discloses that the pressure is detected according to a change in an anti-resonance point of the crystal unit upon a change in the capacitance of the pressure sensor.

The principles disclosed Patent Documents 1 and 2 are completely different than those of the present invention.

[Patent Document 1] Japanese Patent Application Laid-Open (JP-A) No. 2006-138852 (Paragraphs [0021] and [0028])
[Patent Document 2] Japanese Patent Application Laid-Open (JP-A) No. 2008-39626 (FIGS. 1 and 3)

SUMMARY OF THE INVENTION

The present invention was created in light of the above-described background, and an objective thereof is to provide an external force detection apparatus and an external force detection sensor that can detect an external force exerted on a piezoelectric plate with a simple structure and high accuracy.

In one embodiment, an external force detection apparatus is provided to detect an external force acting on a piezoelectric plate. The external force detection apparatus comprises the piezoelectric plate, a first excitation electrode and a second excitation electrode, an oscillating circuit, a movable electrode, a fixed electrode, and a frequency information detecting unit. The piezoelectric plate is cantilevered at one end thereof on a base within a container. The first and the second excitation electrodes are provided respectively on a first surface side and a second surface side of the piezoelectric plate in order to vibrate the piezoelectric plate. The oscillating circuit is electrically connected to the first excitation electrode. The movable electrode is for forming a variable capacitor that is provided on the other end of the piezoelectric plate and electrically connected to the second excitation electrode. The fixed electrode is separated from the piezoelectric plate, provided so as to oppose the movable electrode, and connected to the oscillating circuit, and the fixed electrode forms the variable capacitor upon a change in capacitance between fixed electrode and the movable electrode due to bending of the piezoelectric plate. The frequency information detecting unit is for detecting a signal that is frequency information corresponding to an oscillating frequency of the oscillating circuit. In the piezoelectric plate, a thickness of an area between an area sandwiched by the first and the second excitation electrodes and the movable electrode is less than a thickness of the area sandwiched by the first and the second excitation electrodes. An oscillation loop is formed beginning from the oscillating circuit, passing through the first excitation electrode, the second excitation electrode, the movable electrode, the fixed electrode, and then returning to the oscillating circuit. The frequency information detected by the frequency information detecting unit is for evaluating the external force acting on the piezoelectric plate.

A thickness of an area of the piezoelectric plate in which the movable electrode is provided can be larger than a thickness of an area in which the first and the second excitation electrodes are provided.

In the piezoelectric plate, the area sandwiched by the first and the second excitation electrodes and the area in which the movable electrode is formed can be configured to form a twin with each other.

In one embodiment, an external force detection sensor is provided for detecting an external force acting on a piezoelectric plate based on an oscillating frequency of the piezoelectric plate. The external force detection sensor comprises the piezoelectric plate, a first excitation electrode, a second excitation electrode, a movable electrode, and a fixed electrode. The piezoelectric plate is cantilevered at one end thereof on a base within a container. The first excitation electrode is provided on a first surface side of the piezoelectric plate and electrically connected to an oscillating circuit in order to vibrate the piezoelectric plate. The second excitation electrode is provided on a second surface side of the piezoelectric plate. The movable electrode is for forming a variable capacitor that is provided on the other end of the piezoelectric plate and electrically connected to the second excitation electrode. The fixed electrode is separated from the piezoelectric plate, provided so as to oppose the movable electrode, and connected to the oscillating circuit, and the fixed electrode forms the variable capacitor upon a change in capacitance between fixed electrode and the movable electrode due to bending of the piezoelectric plate. In the piezoelectric plate, a thickness of an area between an area sandwiched by the first and the second excitation electrodes and the movable electrode is less than a thickness of the area sandwiched by the first and the second excitation electrodes.

In the present invention, when an external force is exerted on the piezoelectric plate to bend it or the degree of bending of the piezoelectric plate changes, the distance between a movable electrode on the piezoelectric plate side and a fixed electrode that opposes the movable electrode changes, and thus the capacitance between these two electrodes also changes. The present invention captures this capacitance change and the degree of bending of the piezoelectric plate as a change in an oscillating frequency of the piezoelectric plate. In addition, in the piezoelectric plate, by making the thickness of an area between an area that is sandwiched by the first and the second excitation electrodes and the movable electrode less than the thickness of the area sandwiched by the first and the second excitation excitation electrodes, bending in the area sandwiched by the first and the second excitation excitation electrodes is suppressed, and thus changes in the oscillating frequency due to bending of the piezoelectric plate that become noise during external force detection can be suppressed. Accordingly, even slight deformations of the piezoelectric plate can be detected as changes in the oscillating frequency. Thus, the external force acting on the piezoelectric plate can be measured with high accuracy, and the constitution of the apparatus is simple.

BRIEF DESCRIPTION OF THE DRAWINGS

FIGS. 2A and 2B are plan views respectively illustrating the top surface and bottom surface of a crystal unit used in the first embodiment.

FIG. 3 is a block diagram illustrating a circuit constitution of the acceleration detection apparatus.

DETAILED DESCRIPTION OF EMBODIMENTS

First Embodiment

Figure 1:
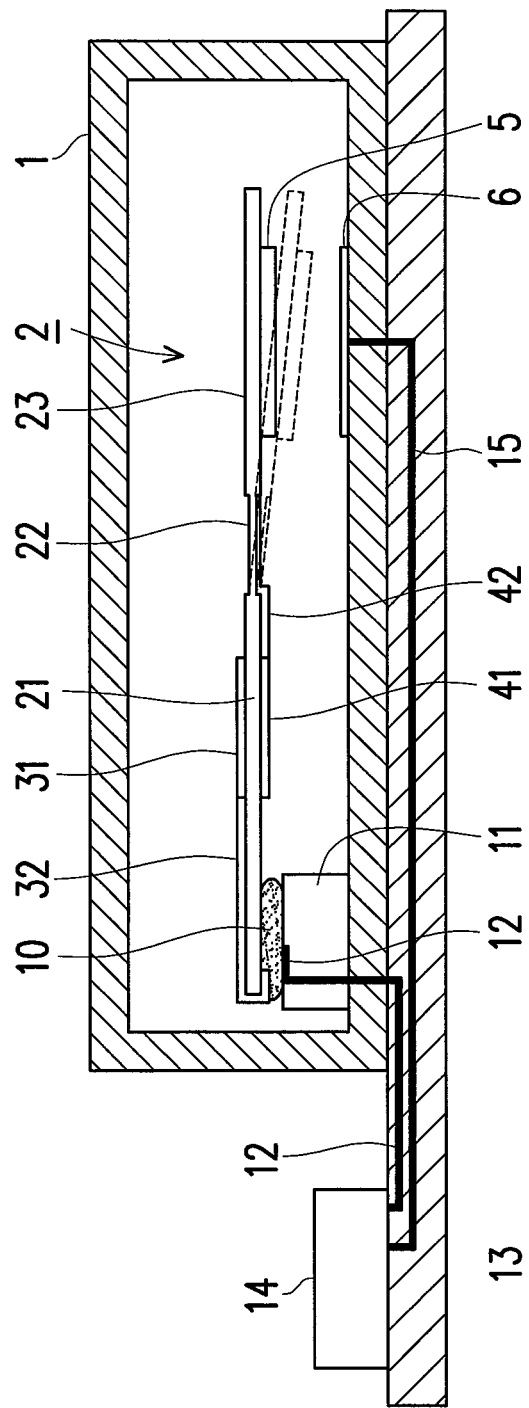
FIG. 1 is a longitudinal cross-sectional side-view illustrating the main parts of a first embodiment utilizing the external force detection apparatus according to the present invention as an acceleration detection apparatus.

An embodiment in which the present invention is applied to an acceleration detection apparatus will now be explained. FIG. 1 illustrates an acceleration sensor corresponding to an external force detection sensor, which is a sensor portion of the acceleration detection apparatus. In FIG. 1, 1 denotes a rectangular parallelepiped-shaped sealed container consisting of, for example, crystal. An inert gas such as nitrogen gas is sealed within the container 1. The container 1 comprises a bottom portion that forms a base and a top portion that is joined to the bottom portion at the peripheral edge. The container 1 is not necessarily limited to a sealed container. In the container 1, a stage 11 consisting of crystal is provided, and one end of a crystal plate 2, which is a piezoelectric plate, is fixed to the top surface of the stage 11 by a conductive adhesive 10. In other words, the crystal plate 2 is cantilevered to the stage 11.

As shown in FIG. 1, the crystal plate 2 is divided into three areas from one end to the other end according to the roles or shapes thereof: an electrode formation area 21, a thin area 22, and an enlarged area 23. First, the electrode formation area 21 is positioned on one end of the crystal plate 2, and as shown in FIGS. 2A and 2B, excitation electrodes 31 and 41 are provided on both surfaces of the electrode formation area 21. The electrode formation area 21 substantially plays a role corresponding to a crystal unit. The thin area 22 is formed to be thinner than the electrode formation area 21 so that it can bend easier. The thin area 22 is designed such that this thin area 22 is mainly bent when an external force is applied. In the enlarged area 23, the thickness is set to be larger than those of the electrode formation area 21 and the thin area 22, and a movable electrode 5 is provided on the bottom surface of the enlarged area 23. The enlarged area 23 has increased weight due to its increased thickness, and thus it also serves as a spindle for enhancing the sensitivity by increasing the bending amount when acceleration is exerted. A spindle can also be separately provided to the enlarged portion 23. In this case, the thickness of the movable electrode 5 can be increased so that it doubles as a spindle, or a spindle that is separate from the movable electrode 5 can be provided to the bottom surface side of the crystal plate 2, or a spindle can be provided to the top surface side of the crystal plate 2.

The enlarged area 23 consists of a twin with respect to the electrode formation area 21 and the thin area 22, and inhibits the excitation electrode 41 from elastically coupling to the movable electrode 5. As a method for forming the twin, for example, using an AT-cut crystal plate 2, the enlarged area 23 alone can be heated and annealed by irradiating a laser on only the enlarged area 23. The laser heating can be carried out in any manner as long as the area that forms the twin is heated, and as a specific example, the areas besides the area that forms the twin can be covered with a mask made of, for example, stainless steel and the entire crystal plate 2 can be irradiated from above by a laser. Alternatively, a metallic film can be formed on the area that forms the twin and the area that forms the twin can be indirectly heated by, for example, heating the metallic film with a laser. At this time, a twin border is formed between the enlarged area 23 and the thin area 22, and for example, light that is reflected on the AT-cut surface appears different from light that is reflected on the surface that becomes the twin. If an AT-cut crystal plate is heated in this way, it changes into a crystal plate that is close to DT-cut. In an AT-cut crystal plate and a DT-cut crystal plate, the directions in which the X-axes extend are the same, but the positive and negative sides of the X-axes are reversed. In other words, the positive sides of the X-axes are inversed by 180°. In the present invention, the electrode formation area 21 can be made of a crystal plate that is close to DT-cut, and the enlarged area 23 can be made of an AT-cut crystal plate. As long as a twin relationship is established, the enlarged area 23 and the thin area 22 can be a twin of the electrode formation area 21.

One end of the crystal plate 2 is fixed by the conductive adhesive 10 and supported on the stage 11. A band-shaped extraction electrode 32 is connected to the excitation electrode 31 on the top surface side of the electrode formation area 21. The extraction electrode 32 is bent back onto the lower surface at one end of the crystal plate 2 and contacts the conductive adhesive 10. A conduction path 12 consisting of a metal layer is provided on the top surface of the stage 11, and the conduction path 12 is connected to one end of an oscillating circuit 14 on an insulating substrate 13 via the insulating substrate 13 that supports the container 1.

A band-shaped extraction electrode 42 is connected to the excitation electrode 41 on the bottom surface side of the electrode formation area 21. The extraction electrode 42 is extracted up to the enlarged area 23 which is the other end (distal end) of the crystal plate 2 via the thin area 22, and connected to the movable electrode 5 for forming a variable capacitor that is provided on the bottom surface of the enlarged area 23. Meanwhile, a fixed electrode 6 for forming the variable capacitance is provided on the container 1 side.

Figure 4:
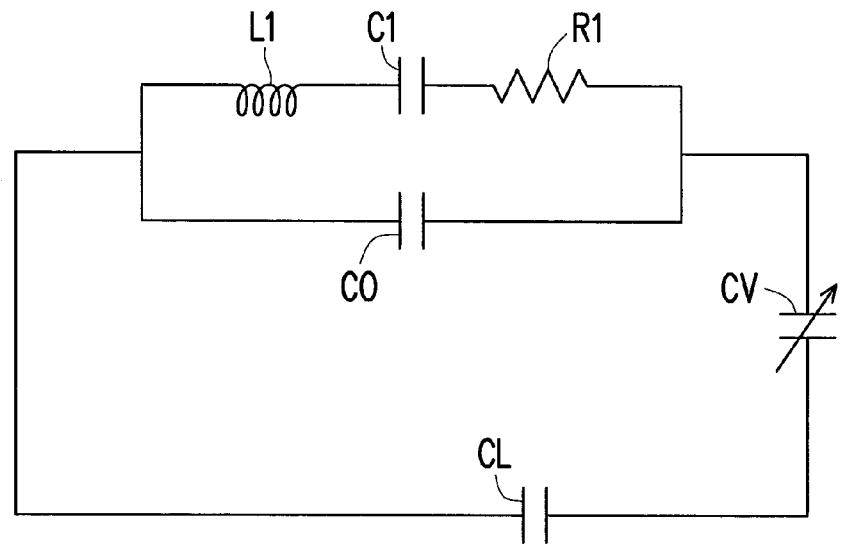
FIG. 4 is a circuit diagram illustrating an equivalent circuit of the acceleration detection apparatus.

The fixed electrode 6 is connected to the other end of the oscillating circuit 14 via a conduction path 15 that is wired via the insulating substrate 13. FIG. 3 illustrates the connection state of wiring of the acceleration sensor, and FIG. 4 illustrates an equivalent circuit. L1 denotes a serial inductance corresponding to the mass of a crystal unit, C1 denotes a serial capacitor, R1 denotes a serial resistor, C0 denotes an RMS shunt capacitor that includes an inter-electrode capacitor, and CL denotes a load capacitor of the oscillating circuit 14. The excitation electrode 31 on the top surface side and the excitation electrode 41 on the bottom surface side are connected to the oscillating circuit 14, but a variable capacitor Cv formed between the movable electrode 5 and the fixed electrode 6 is interposed between the excitation electrode 41 on the bottom surface side and the oscillating circuit 14.

According to International Standard IEC 60122-1, a general formula for crystal oscillating circuits is represented by the following formula (1).

$$FL = Fr \times (1+x)$$

$$x = (C1/2) \times 1/(C0+CL) \quad (1)$$

FL is the oscillating frequency when a load is applied to the crystal unit, and Fr is the resonance frequency of the crystal unit itself.

In the present embodiment, as shown in FIGS. 3 and 4, a load capacitance of the crystal plate 2 is Cv added to CL. Therefore, y represented by formula (2) is substituted for CL in formula (1).

$$y = 1/(1/Cv + 1/CL) \quad (2)$$

Accordingly, if the bending amount of the crystal plate 2 changes from a State 1 to a State 2, and thereby the variable capacitance Cv changes from Cv1 to Cv2, then a frequency change ΔF is represented by formula (3).

$$\Delta FL = FL1 - FL2 = A \times CL^2 \times (Cv2 - Cv1)/(B \times C) \quad (3)$$

Herein,
A=C1×Fr/2,
B=C0×CL+(C0+CL)×Cv1, and
C=C0×CL+(C0+CL)×Cv2.

If a separation distance between the movable electrode 5 and the fixed electrode 6 in a so-called reference state when no acceleration is being exerted on the crystal plate 2 is denoted as d1, and the separation distance when an acceleration is exerted on the crystal plate 2 is denoted as d2, the following formula (4) is established.

$$Cv1 = S \times \in /d1$$

$$Cv2 = S \times \in /d2 \quad (4)$$

Herein, S is the surface area of an opposing region of the movable electrode 5 and the fixed electrode 6, and ∈ is a dielectric constant.

Since d1 is already known, it can be understood that ΔFL and d2 are in a correspondence relationship.

The acceleration sensor, which is a sensor portion in this kind of embodiment, is in a state in which, for example, the crystal plate 2 is slightly bent even under conditions in which an external force in accordance with an acceleration is not exerted. Whether the crystal plate 2 is in a bent state or is maintained in a horizontal position is determined in accordance with the thickness or the like of the crystal plate 2. An acceleration sensor with this kind of constitution is used in, for example, an acceleration sensor for detecting horizontal shaking and an acceleration sensor for detecting vertical shaking. The crystal plate 2 is arranged to be vertical in the former, and the crystal plate 2 is arranged to be horizontal in the latter.

If an earthquake occurs or a simulated vibration is exerted, the crystal plate 2 bends as shown by the dot-dashed lines shown in FIG. 1 or the solid lines shown in FIG. 3. At this time, the enlarged area 23 in which the movable electrode 5 is formed vibrates in the vertical direction due to the bending of the crystal plate 2, and thus the variable capacitance Cv changes based on the vibration, and the oscillating frequency also changes. Most of the bending of the crystal plate 2 occurs in the thin area 22 which does not have much thickness whereas the electrode formation area 21 hardly bends at all. Therefore, changes in the oscillating frequency due to bending in the electrode formation area 21 are small. If a frequency that is detected by a frequency detecting unit 100, which is a frequency information detecting unit, in a state in which no vibration is exerted is denoted as FL1, and the frequency when a vibration (acceleration) is exerted is denoted as FL2, the frequency difference FL1-FL2 is represented by formula (3).

In FIG. 3, 101 denotes a data processing unit that includes, for example, a personal computer. The data processing unit 101 has a function to calculate a difference between a frequency f0 when no acceleration is exerted on the crystal plate 2 and a frequency f1 when an acceleration is exerted, based on the frequency information, such as the frequency, obtained from the frequency detecting unit 100, and then calculate the acceleration referring to a data table associating the frequency difference and the acceleration. The frequency information is not limited to a frequency difference, and the frequency information can also be a frequency change rate [(f1−f0)/f0], which is information corresponding to the frequency difference.

According to the first embodiment, when an external force acts on the crystal plate 2 to bend it or the degree of bending of the crystal plate 2 changes, the distance between the movable electrode 5 on the crystal plate 2 side and the fixed electrode 6 that opposes the movable electrode 5 changes, and thus the capacitance between the electrodes 5 and 6 also changes. Therefore, this capacitance change and the deformation of the crystal plate 2 appear as a change in the oscillating frequency of the crystal plate 2. As a result, even slight deformations of the crystal plate 2 can be detected as changes in the oscillating frequency. Thus, the external force acting on the crystal plate 2 can be measured with high accuracy, and the constitution of the apparatus is simple.

Further, in the crystal plate 2, by making the thickness of the thin area 22 less than the thickness of the electrode formation area 21 sandwiched by the excitation electrodes 31 and 41, the bending in the electrode formation area 21 is suppressed, and thus changes in the oscillating frequency due to bending of the crystal plate 2 that become noise during external force detection are suppressed. Also, since the electrode formation area 21 and the enlarged area 23 are formed as a twin with each other, elastic coupling of the excitation electrode 41 and the movable electrode 5 can be inhibited. Accordingly, a more stable measurement can be taken. Here, "as a twin with each other" is not limited to the case in which the directions in which the X-axes extend are the same but the positive and negative sides of the X-axes are reversed, and the directions in which the X-axes extend can be different, in other words, the X-axes can be in a relationship in which they intersect each other (a relationship in which the crystal axes intersect each other).

In addition, by making the thickness of the enlarged area 23 larger than that of the electrode formation area 21 to increase its weight, the amount of bending of the thin area 22, in other words the amplitude of the vibration of the enlarged area 23, increases, and thus the acceleration of the vibration becomes easier to detect. If the thickness of the electrode formation area 21 is increased, the oscillating frequency decreases and the accuracy of the detection drops. Therefore, there is a limit to how much the thickness of the electrode formation area 21 can be increased. On the other hand, instead of increasing the weight of the enlarged area 23 by increasing the thickness of the enlarged area 23, the weight can be increased by forming a metal film on the enlarged area 23, but this requires some effort. Therefore, it is preferable to increase the thickness of the enlarged area 23 beyond that of the electrode formation area 21. However, in the present invention, the thickness of the enlarged area 23 can be the same as or less than that of the electrode formation area 21. If the thickness of the enlarged area 23 is less than that of the electrode formation area 21, the relationship between the bending amount and the external force can be adjusted by, for example, attaching a thick metal film.

Second Embodiment

Figure 5:
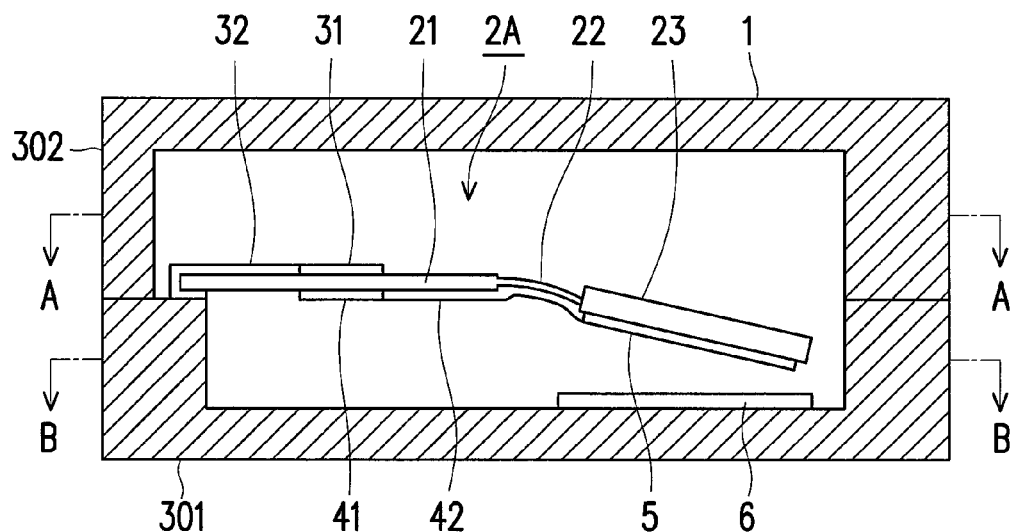
FIG. 5 is a longitudinal side view illustrating a second embodiment utilizing the external force detection apparatus according to the present invention as an acceleration detection apparatus.
Figure 6:
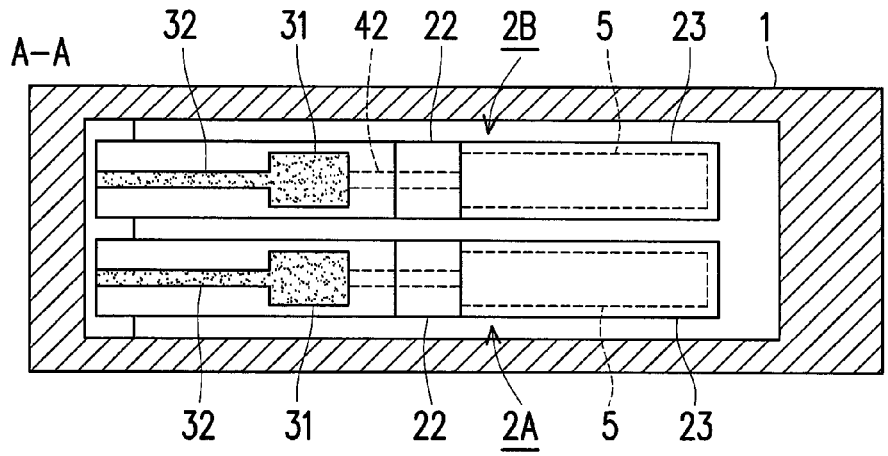
FIG. 6 is a cross-section view along line A-A in FIG. 5.

FIG. 5 illustrates an acceleration sensor according to a second embodiment of the present invention. The second embodiment differs from the above-described first embodiment in that the group consisting of the crystal plate 2, the excitation electrodes 31 and 41, the movable electrode 5, the fixed electrode 6, and the oscillating circuit 14 explained above is doubled into two groups. 301 is a bottom portion that forms a base constituting the bottom side of the container 1, and 302 is a top portion that forms a lid that constitutes the top side of the container 1. For the crystal plate 2 and the oscillating circuit 14, the reference numeral "A" is attached to the parts of one group and the reference numeral "B" is attached to the parts of the other group. In FIG. 5, the crystal plate 2 of one side is shown, and FIG. 5 is the same as FIG. 1 as a side view. In a plan view of the inside of the pressure sensor of FIG. 5, a first crystal plate 2A and a second crystal plate 2B are arranged horizontally parallel as shown in FIG. 6.

Figure 7:
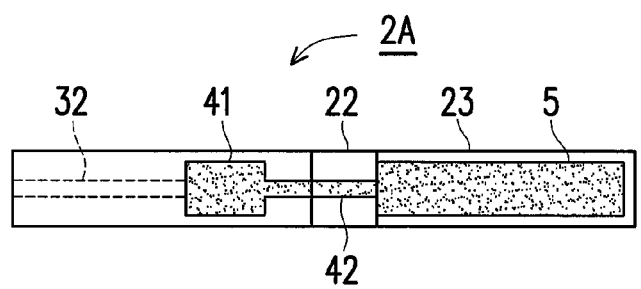
FIG. 7 is a plan view illustrating a rear surface side of a crystal plate used in the second embodiment.
Figure 8:
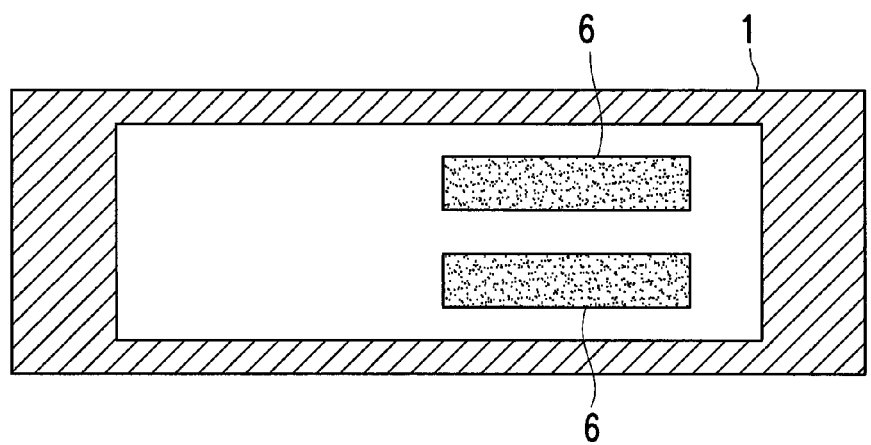
FIG. 8 is a cross-section view along line B-B in FIG. 5.

The crystal plates 2A and 2B have the same structure, and thus only one, the crystal plate 2A, will be explained. As shown in FIG. 5, the crystal plate 2A is divided into three areas from one end to the other end: an electrode formation area 21 that plays the role of a crystal unit, in which excitation electrodes 31 and 41 are provided on both sides thereof; a thin area 22 that is formed to be thinner than the electrode formation area 21 so that it can bend easier; and an enlarged area 23 that also plays the role of a spindle for enhancing the sensitivity, in which a movable electrode is provided on the bottom surface thereof. On one surface side (top surface side) of the electrode formation area 21, a narrow extraction electrode 32 extends from one end toward the other end, and the first excitation electrode 31 is formed in a hexagonal shape on the distal end of the extraction electrode 32. On the other surface side (bottom surface side) of the electrode formation area 21, the second excitation electrode 41 is formed to oppose the first excitation electrode 31 as shown in FIGS. 6 and 7, and a narrow extraction electrode 42 extends toward the distal end of the crystal plate 2A on the excitation electrode 41. The extraction electrode 42 extends up to the enlarged area 23 via the thin area 22, and a narrow strip-shaped movable electrode 5 for forming a variable capacitance is formed on the distal end of the extraction electrode 42. These electrodes 31 and the like are formed by conductive films such as metal films. As shown in FIG. 8, narrow strip-shaped fixed electrodes 6 are provided on the bottom of the container 1 for both the movable electrode 5 of the crystal plate 2A and the movable electrode 5 of the crystal plate 2B.

Figure 9:
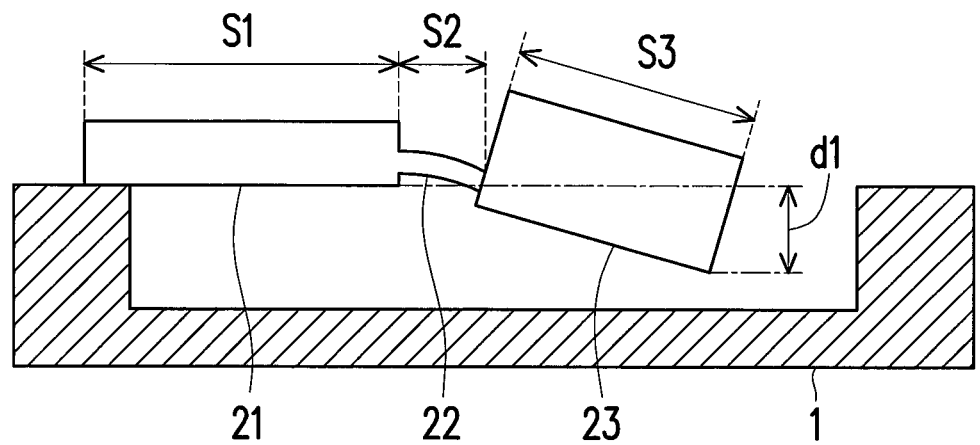
FIG. 9 is a longitudinal side view illustrating a state in which the crystal plate bends due to an external force and the dimensions of each part in the second embodiment.

An example of the dimensions of each part of the crystal plate 2A (2B) will now be explained referring to FIG. 9. The length dimensions S1, S2, and S3 and the width dimension of each area 21, 22, and 23 of the crystal plate 2A (2B) are respectively 5 mm, 1 mm, 7 mm, and 1.6 mm. The thicknesses of each area 21, 22, and 23 of the crystal plate 2A (2B) are respectively, for example, 20 μm, 10 μm, and 90 μm. If the support surface on one end of the crystal plate 2A (2B) is set in parallel on the horizontal surface, the crystal plate 2A (2B) bends by its own weight in a natural state in which no acceleration is exerted. The bending amount d1 is, for example, approximately 0.01 μm. These dimensions are merely one example.

Figure 10:
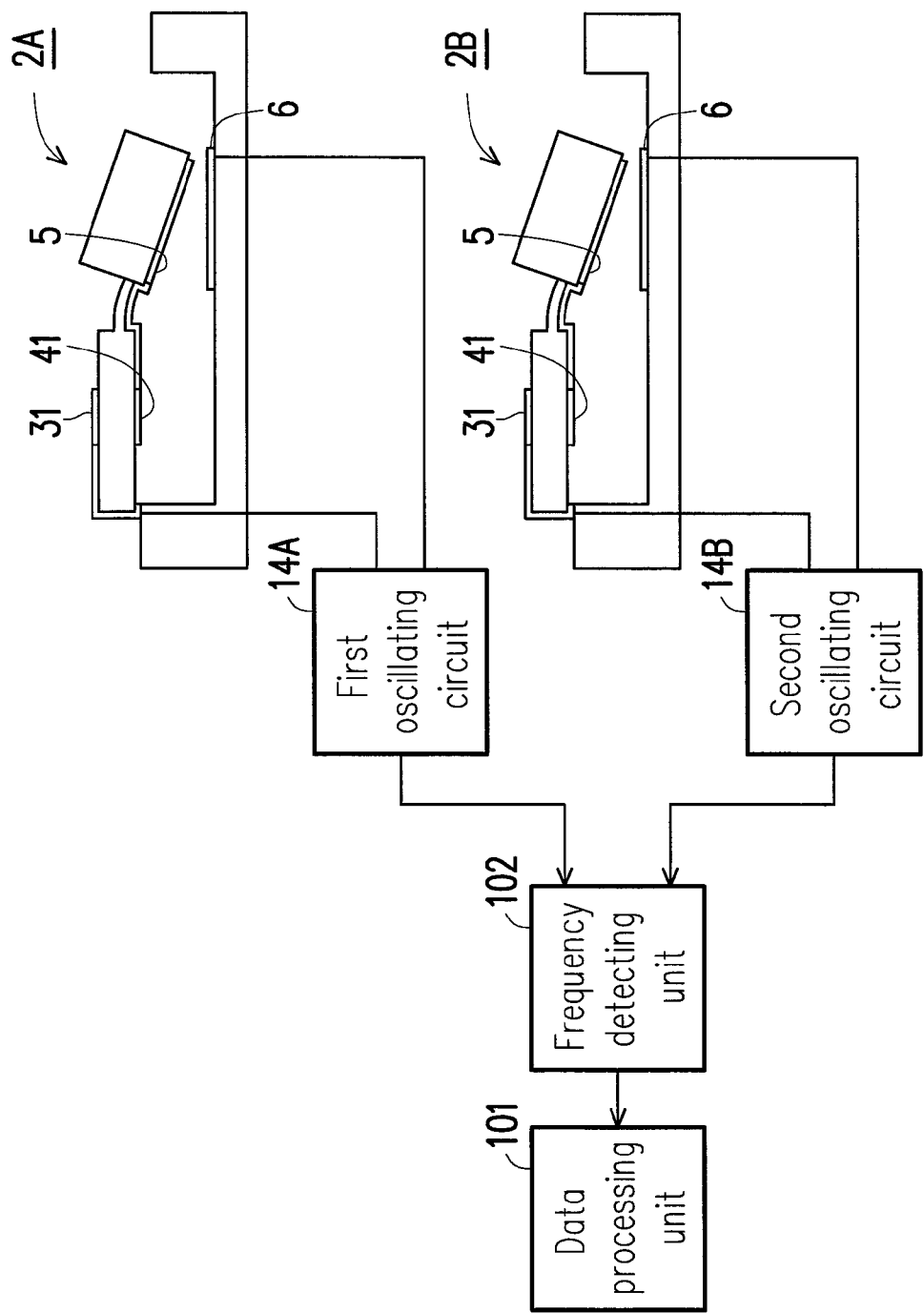
FIG. 10 is a block circuit diagram illustrating a circuit of the acceleration detection apparatus according to the second embodiment.
Figure 11:
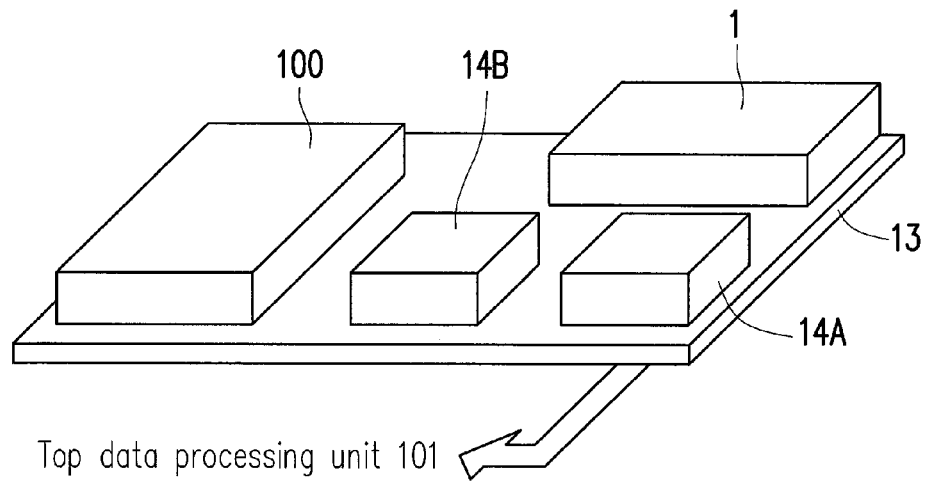
FIG. 11 is an external appearance view illustrating the external appearance of a portion of the acceleration detection apparatus according to the second embodiment.

FIG. 10 illustrates a circuit of the acceleration detection apparatus according to the second embodiment. FIG. 11 illustrates the external appearance of a portion of the acceleration detection apparatus. The points of different from the above-described first embodiment are that a first oscillating circuit 14A and a second oscillating circuit 14B are connected respectively responsive to the first crystal plate 2A and the second crystal plate 2B, and an oscillating loop consisting of the oscillating circuit 14A (14B), the excitation electrodes 31 and 41, the movable electrode 5, and the fixed electrode 6 is formed in each of the first crystal plate 2A and the second crystal plate 2B. The outputs from the oscillating circuits 14A and 14B are sent to a frequency information detecting unit 102, and therein the difference in the oscillating frequencies or the difference in frequency change rates from the oscillating circuits 14A and 14B is detected.

A frequency change rate has the following meaning. In the oscillating circuit 14A, if the frequency in the reference state in which the crystal plate 2A bends by its own weight is called a reference frequency, when the crystal plate 2A bends further due to acceleration and the frequency thereby changes, the frequency change rate is a value represented by change in frequency/reference frequency, and is represented in, for example, units of ppb. The frequency change rate is calculated in the same way for the crystal plate 2B. The difference in these change rates is output to the data processing unit 101 as information corresponding to the frequency. Data associating, for example, the difference in change rates with the size of acceleration is pre-stored in a memory in the data processing unit 101, and the acceleration is detected based on this data and the difference in change rates.

As one example of the relationship between the bending amount (difference in the height level of the distal end portion when the crystal plate is extended in a straight line and when it is bending) of the crystal plate 2A (2B) and the amount of change in frequency, for example, if the distal end of the crystal plate 2A (2B) changes on the order of $10^{-5}$ μm, the change in frequency is 0.65 ppb when the oscillating frequency is 70 MHz. Therefore, even extremely small external forces such as acceleration can be accurately measured.

According to the above-described second embodiment, in addition to the effects of the first embodiment, since the crystal plate 2A and the crystal plate 2B are arranged in the same temperature environment, even if the respective frequencies of the crystal plate 2A and the crystal plate 2B change due to temperature, such a change can be cancelled so that the detection can be limited to only changes in frequency based on bending of the crystal plates 2A and 2B. Therefore, an effect is achieved in that the detection accuracy is high.

In the above-described second embodiment, in both the crystal plate 2A and the crystal plate 2B, a variable capacitance Cv consisting of the movable electrode 5 and the fixed electrode 6 is formed and incorporated into a respective oscillating loop. However, a variable capacitance does not have to be incorporated into an oscillating loop in one of the crystal plates, such as the crystal plate 2B, and acceleration can be detected using the crystal plate 2B as a reference crystal plate. In this case as well, the oscillating frequency change rate is found for both of the crystal plates 2A and 2B, and the size of acceleration is calculated from the difference in the oscillating frequency change rates. Thereby, influences on the acceleration detection due to changes in the environmental temperature can be eliminated.

Figure 12:
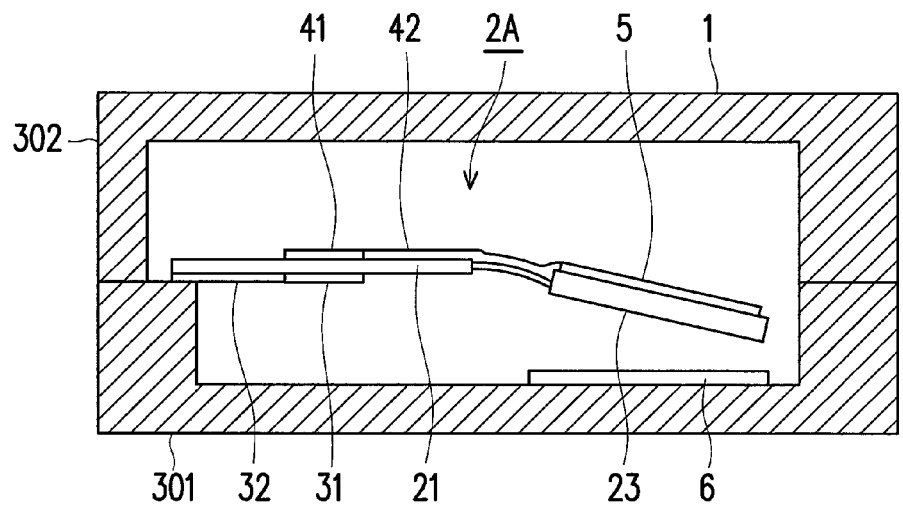
FIG. 12 is a longitudinal side view showing another alternative embodiment of the present invention.

FIG. 12 explains an alternative embodiment of the present invention.

The acceleration sensor illustrated in FIG. 12 adopts a structure which inverses the top surface and the bottom surface of the crystal plate 2A (2B) used in the second embodiment as a crystal unit including the crystal plate 2. In this case, the enlarged area 23 is interposed between the movable electrode 5 and the fixed electrode 6, and the same operation and effects are obtained in this structure.

Third Embodiment

Figure 13:
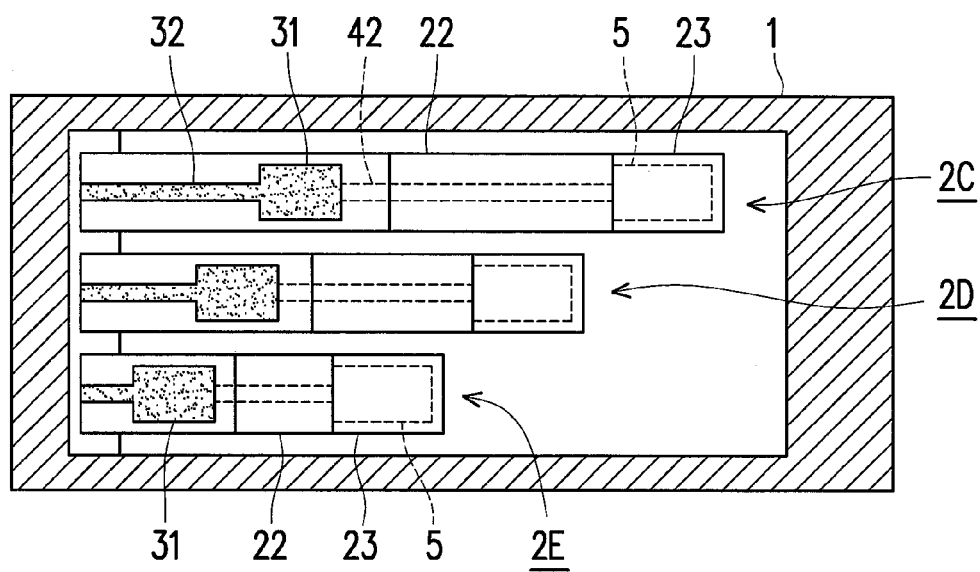
FIG. 13 is a plan view illustrating an acceleration sensor in a third embodiment.

An acceleration sensor according to a third embodiment of the present invention is illustrated in FIG. 13. In this embodiment, members which have the same structure and role as those in the first embodiment are assigned the same reference numerals, and explanations thereof are omitted. In this acceleration sensor, three crystal plates 2C, 2D, and 2E having different lengths are cantilevered within the container 1. In the crystal plates 2C to 2E, the thickness of the thin areas 22, the thickness (weight) of the enlarged areas 23, the area of the movable electrodes 5, and the like are all the same, whereas the length of the thin areas 22 is the only difference between the three plates. Since the lengths of the thin areas 22 are different, when a force of a certain size is exerted on the crystal plates 2C to 2E, the manner in which the thin area 22 of each crystal plate bends is different. Therefore, the amount of change in the variable capacitance Cv of each crystal plate is also different. Accordingly, the range in the size of external force that can be detected by each crystal plate 2C to 2E is different. In other words, as the length dimension of the thin area 22 increases in each of the crystal plates 2C to 2E, the bending amount (displacement magnitude of the movable electrode 5) when a force of a certain size is exerted increases, and thus as the length dimension of the thin area 22 increases, the range in the size of external force that can be detected shifts toward smaller values.

Figure 14:
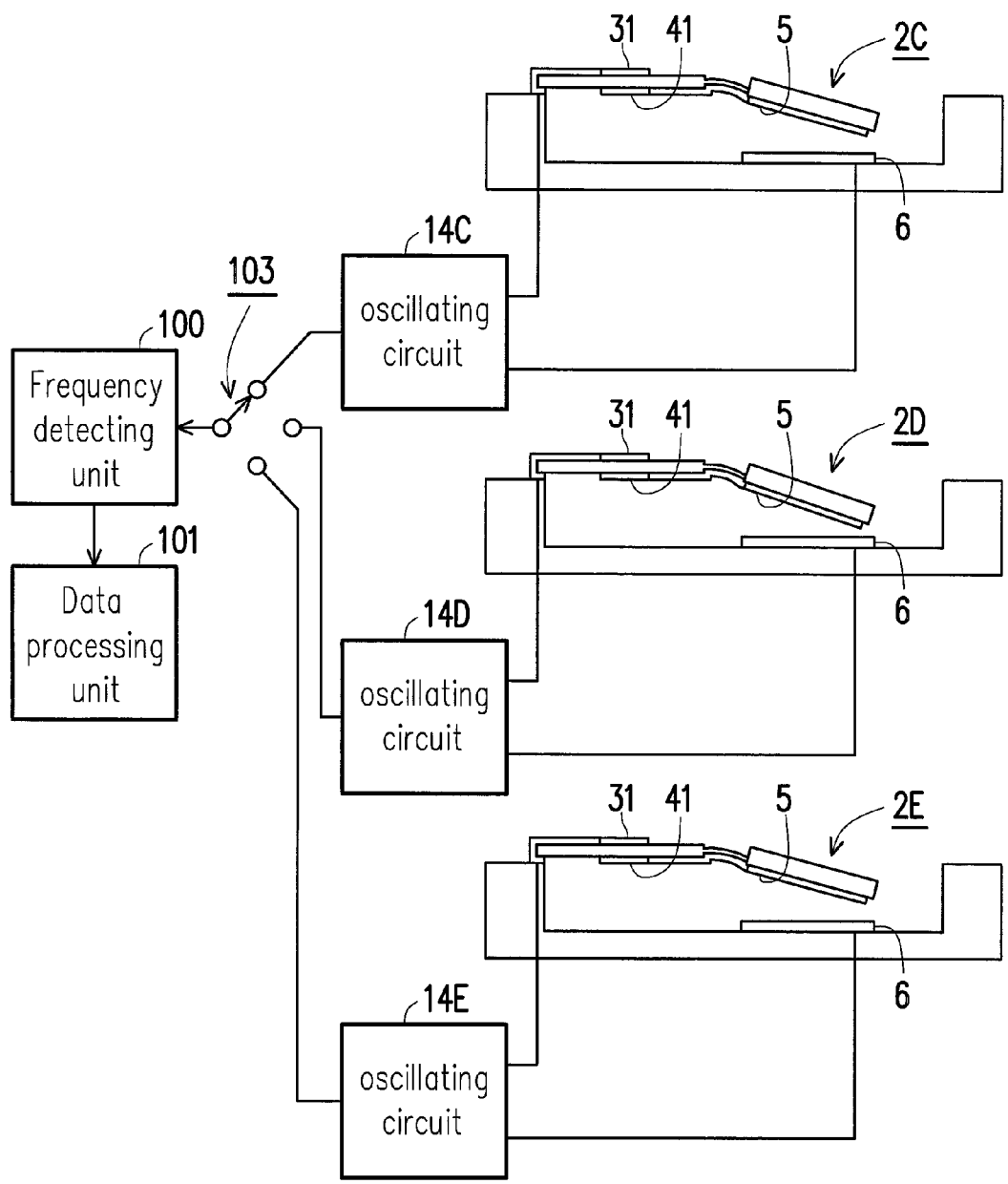
FIG. 14 is a block diagram illustrating a circuit constitution of an external force detection apparatus in the third embodiment.

Regarding the electrical connection in the present embodiment, as shown in FIG. 14, the crystal plates 2C to 2E are respectively connected to oscillating circuits 14C to 14E which correspond to each crystal plate to constitute oscillating loops. The output terminals of the oscillating circuits 14C to 14E are each connected to a selection terminal of a switching unit 103 so that the crystal plate which detects the oscillating frequency can be selected from among the crystal plates 2C to 2E. The fixed terminal of the switching unit 103 is connected to the data processing unit 101 via the frequency detecting unit 100. In FIG. 14, for the sake of convenience, the thin areas 22 of the crystal plates 2C to 2E are depicted with the same lengths, but actually the lengths are different.

Therefore, the crystal plate which has a detection range that matches the size of the external force which is the target of detection can be selected from among the crystal plates 2C to 2E by the switching unit 103, and thereby this external force detection apparatus can be utilized for detection of external forces of a wide range of sizes.

In the third embodiment, three crystal plates 2C to 2E are provided, but the number of crystal plates is not limited as long as a plurality is provided.

In the third embodiment, for the crystal plates 2C to 2E, a twin sensor can be employed as in the second embodiment. Thereby, errors in the oscillating frequency due to temperature changes can be counteracted, enabling more accurate measurement.

In addition, in the third embodiment, in the crystal plates 2C to 2E, the range in the size of external force that can be detected is changed by changing only the length of the thin area 22. However, this embodiment is not limited to such a constitution, and the range in the size of external force that can be detected can also be changed by changing the thickness of the thin area 22, the weight of the enlarged area 23, or the like.

In the above, the present invention is not limited to measuring acceleration, and it can also be applied to measuring a magnetic force, measuring the degree of inclination of an object to be measured, measuring the flow rate of a fluid, measuring wind speed, and the like.

An example of a constitution in the case of measuring a magnetic force will now be explained. In such a constitution, a film of a magnetic body is formed in the enlarged area 23 of the crystal plate 2, and when the magnetic body is positioned in a magnetic field, the crystal plate 2 bends.

In addition, the crystal plate 2 can be exposed to a fluid such as a gas or liquid, and the flow rate can be detected via frequency information in accordance with the bending amount of the crystal plate. In this case, the thickness of the crystal plate 2, especially the thickness of the thin area 22, is determined by the range of measurement of the flow rate or the like. Further, the present invention can also be applied to the case of measuring gravity.

Figure 15A:
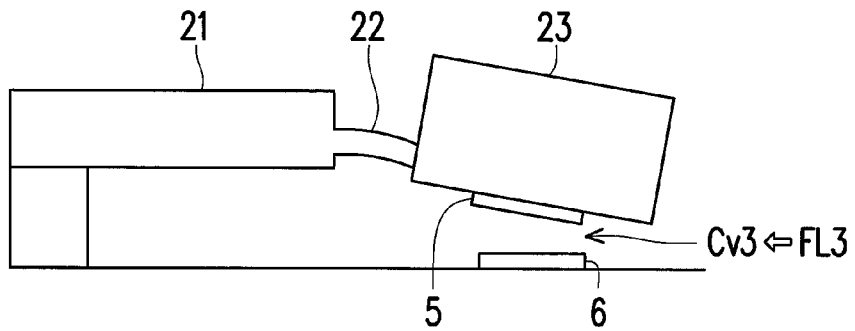
FIGS. 15A and 15B are an explanatory view illustrating a state in which the crystal plate vibrates.
Figure 15B:
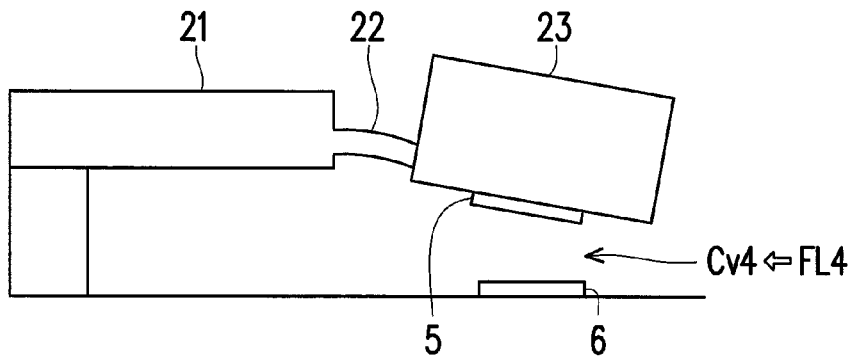
Figure 16:
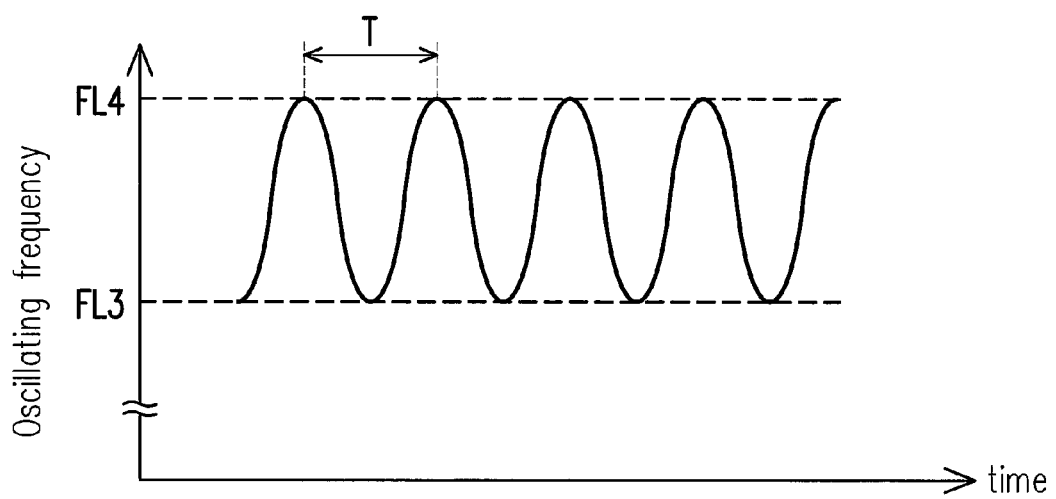
FIG. 16 is a frequency characteristics chart illustrating how the oscillating frequency changes due to vibration of the crystal plate.

In addition to detecting an external force value itself as in the above-explained embodiments, the present invention can also detect vibration (frequency of vibration) corresponding to an external force. Specifically, the present invention can be applied to a vibration detection apparatus whose target is an earthquake or the like. In this case, the structure of the vibration detection apparatus is the same as the external force detection apparatus according to the second embodiment, and thus an explanation thereof will be omitted. If an earthquake occurs and vibration is exerted on the vibration detection apparatus, the crystal plate 2 shakes and, for example, it repeatedly switches between a first state shown in FIG. 15A and a second state shown in FIG. 15B. If the values of the variable capacitances Cv in the first state and the second state are respectively denoted as Cv3 and Cv4, the respective oscillating frequencies FL3 and FL4 are calculated in accordance with formulas (1) and (2) described above. The oscillating frequency changes over time between FL3 and FL4 as shown in FIG. 16. Therefore, by analyzing frequency data detected by the frequency information detecting unit 102 with the data processing unit 101, a period T (corresponding to the frequency) of the waves of the frequency change shown in FIG. 16 can be calculated. The period T of the frequency change corresponds to the period of the tremors, and the amplitude of the change in oscillating frequency, in other words the difference between the oscillating frequencies FL3 and FL4, corresponds to the amplitude of the tremors. Therefore, seismic waves can be detected by the present invention.

When the vibration detection apparatus vibrates due to seismic waves, acceleration acts on the crystal plate 2 in one direction and the opposite direction, and the frequency data as shown in, for example, FIG. 16 can be obtained as explained above. Therefore, even vibration at a low frequency of approximately 0.5 Hz can be accurately detected.

The present invention is not limited to tremors of an earthquake as explained above, and can also be applied to the case of detecting a period of vibration that is generated in a simulation. Further, for example, the present invention can also be applied to a case such as detecting a period of vibration that is generated in, for example, a washing machine main body by rotating water flow or the like including items to be washed when the washing machine is operating.

What is claimed is:

1. An external force detection apparatus that detects an external force acting on a piezoelectric plate, the external force detection apparatus comprising:
    the piezoelectric plate that is cantilevered at one end thereof on a base within a container;
    a first excitation electrode and a second excitation electrode provided respectively on a first surface side and a second surface side of the piezoelectric plate in order to vibrate the piezoelectric plate;
    an oscillating circuit that is electrically connected to the first excitation electrode;
    a movable electrode for forming a variable capacitor that is provided on the other end of the piezoelectric plate and electrically connected to the second excitation electrode,
    a fixed electrode that is separated from the piezoelectric plate, provided so as to oppose the movable electrode, and connected to the oscillating circuit, the fixed electrode forming the variable capacitor upon a change in capacitance between the fixed electrode and the movable electrode due to bending of the piezoelectric plate; and
    a frequency information detecting unit for detecting a signal that is frequency information corresponding to an oscillating frequency of the oscillating circuit,
    wherein in the piezoelectric plate, a thickness of an area between an area sandwiched by the first and the second excitation electrodes and the movable electrode is less than a thickness of the area sandwiched by the first and the second excitation electrodes,
    an oscillation loop is formed beginning from the oscillating circuit, passing through the first excitation electrode, the second excitation electrode, the movable electrode, the fixed electrode, and then returning to the oscillating circuit, and
    the frequency information detected by the frequency information detecting unit is for evaluating the external force acting on the piezoelectric plate.

2. The external force detection apparatus according to claim 1, wherein a thickness of an area of the piezoelectric plate in which the movable electrode is provided is larger than a thickness of an area in which the first and the second excitation electrodes are provided.

3. The external force detection apparatus according to claim 1, wherein in the piezoelectric plate, the area sandwiched by the first and the second excitation electrodes and the area in which the movable electrode is formed is configured to form a twin with each other.

4. An external force detection sensor that detects an external force acting on a piezoelectric plate based on an oscillating frequency of the piezoelectric plate, the external force detection sensor comprising:
    the piezoelectric plate that is cantilevered at one end thereof on a base within a container;
    a first excitation electrode provided on a first surface side of the piezoelectric plate and electrically connected to an oscillating circuit in order to vibrate the piezoelectric plate;
    a second excitation electrode provided on a second surface side of the piezoelectric plate;
    a movable electrode for forming a variable capacitor that is provided on the other end of the piezoelectric plate and electrically connected to the second excitation electrode;
    a fixed electrode that is separated from the piezoelectric plate, provided so as to oppose the movable electrode, and connected to the oscillating circuit, the fixed electrode forming the variable capacitor upon a change in capacitance between the fixed electrode and the movable electrode due to bending of the piezoelectric plate,
    wherein in the piezoelectric plate, a thickness of an area between an area sandwiched by the first and the second excitation electrodes and the movable electrode is less than a thickness of the area sandwiched by the first and the second excitation electrodes.

* * * * *